United States Patent [19]  
Goss

[11] 4,425,936  
[45] Jan. 17, 1984

[54] CONCENTRIC TUBE HEAT TRACING APPARATUS

[75] Inventor: David C. Goss, San Marcos, Tex.

[73] Assignee: Thermon Manufacturing Company, San Marcos, Tex.

[21] Appl. No.: 404,432

[22] Filed: Aug. 2, 1982

[51] Int. Cl.³ .............................................. F16L 53/00
[52] U.S. Cl. .................... 137/340; 165/142; 165/164; 165/76
[58] Field of Search ................ 165/164, 142, 169, 47; 137/340, 334

[56]           References Cited
        U.S. PATENT DOCUMENTS

| | | |
|---|---|---|
| 1,318,237 | 10/1919 | Sordi . |
| 1,555,601 | 9/1925 | Otis et al. .......................... 137/340 |
| 2,216,866 | 10/1940 | White .............................. 137/340 X |
| 3,275,102 | 9/1966 | Holzinger et al. ............... 137/340 X |
| 3,305,600 | 2/1967 | Hopper et al. ................... 165/142 X |
| 3,319,709 | 5/1967 | Strunk ............................. 165/142 X |
| 3,834,458 | 9/1974 | Bilbro et al. . |
| 3,949,189 | 4/1976 | Bilbro et al. . |
| 3,971,416 | 7/1976 | Johnson . |
| 4,031,611 | 6/1977 | Johnson, Jr. . |
| 4,123,837 | 11/1978 | Horner . |
| 4,152,577 | 5/1979 | Leavines . |
| 4,203,186 | 5/1980 | Horner . |

Primary Examiner—Albert W. Davis, Jr.  
Attorney, Agent, or Firm—Pravel, Gambrell, Hewitt, Kirk & Kimball

[57]             ABSTRACT

A new and improved heat transfer apparatus and method, wherein a heat tracing conduit assembly provides a self-contained closed conduit loop formed of two concentric tubular conduit members which may be laid as a single unit on the fluid pipe, thereby eliminating the need for a separately mounted return conduit.

8 Claims, 6 Drawing Figures

CONCENTRIC TUBE HEAT TRACING APPARATUS

BACKGROUND OF INVENTION

1. Field of Invention

This invention relates to heat transfer apparatus, particularly for heating or cooling pipes or like objects via a fluid medium disposed within a heat transfer assembly mounted externally on the pipe. The term "pipe" as used herein includes tubes, conduits or other members, the contents of which is to be heated or cooled by the heat transfer element.

2. Description of Prior Art

U.S. Pat. No. 1,318,237 disclosed a double walled radiator structure for heating liquids as part of an apparatus for radiant heating for homes or rooms. U.S. Pat. Nos. 3,834,458; 3,949,189; 3,971,416; and 4,031,611 owned by the common assignee of the present application disclosed heat transfer assemblies and methods for making the same which generally included a heat transfer element bonded or mounted in heat exchanging relationship to the pipe or conduit using a heat transfer material or mechanical mounting means. Likewise, U.S. Pat. Nos. 4,123,837; 4,152,577 and 4,203,186 disclosed methods of enhancing heat transfer between the heating or cooling elements and the pipe to be heated or cooled. All of these prior patents were addressed primarily to improvements in the heat exchanging relationship between the heating or cooling element and the pipe which was to be heated or cooled. In each of the prior art methods or apparatus, it was contemplated that the heat tracing element, such as a steam tracing tube or an electric resistance heater would be attached to the pipe and trace the path of the pipe to its extremities thereby providing controlled heat or cooling to the pipe system. In past steam or fluid tracing temperature control methods and apparatus it was necessary to separately mount a return conduit to return the heating or cooling fluid from the extremities of the pipe system back to a fluid reservoir located at the central point of the heat traced system. This requirement was particularly undesirable in applications where it was not possible to mount the return conduit adjacent and parallel to the heat tracing conduit making it necessary to mount the return conduit on the opposite side of the pipe being heated or cooled, or at some other even less desirable location away from the pipe. In any event, providing such a return pipe increased the labor and materials costs to install the heat exchange system.

SUMMARY OF THE INVENTION

In contrast to the foregoing, the present invention provides a new and improved heat transfer apparatus and method, wherein a heat tracing conduit assembly provides a self-contained closed conduit loop formed of two concentric tubular conduit members which may be laid as a single unit on the fluid pipe, thereby eliminating the need for a separately mounted return conduit. The heat transfer fluid from the reservoir is circulated in the space formed between the inner and outer conduits and returned to the reservoir within the inner conduit. In this manner, a complete conduit loop is provided in a single unit which is mounted to the pipe system using a suitable conventional heat transfer cement and the need for a separately mounted return conduit is eliminated.

DESCRIPTION OF THE PREFERRED EMBODIMENT

Figure 2:
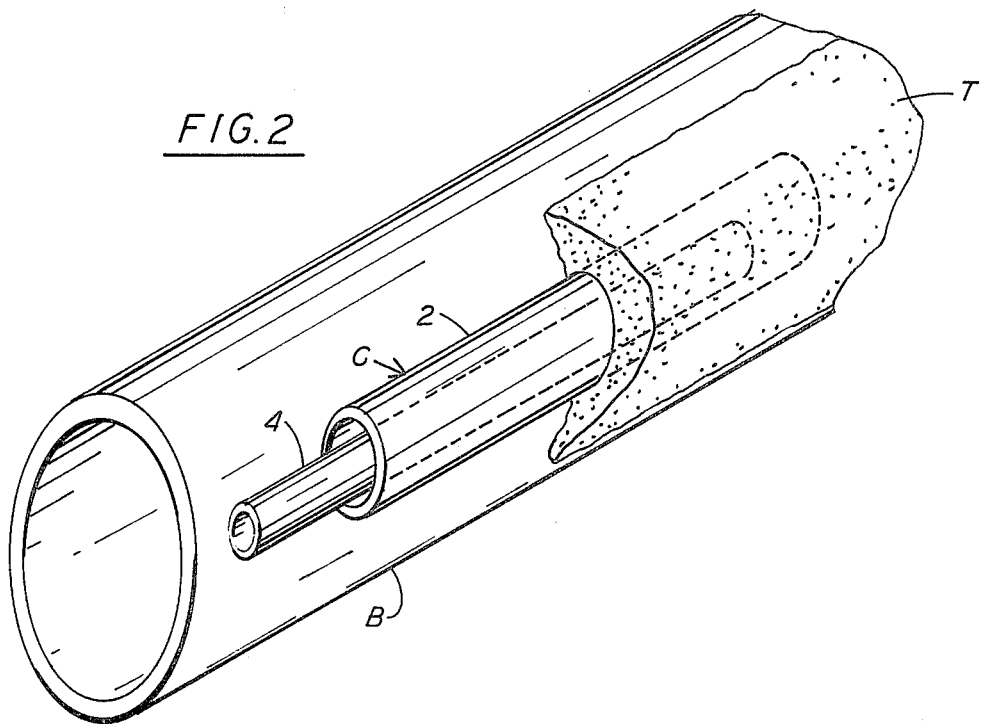
FIG. 2 is an isometric view of a portion of the apparatus according to the present invention mounted in heat exchange relationship to a pipe.

In the drawings, the letter A designates generally an apparatus according to the present invention for controlling the temperature of a fluid inside of a pipe or like object B. Briefly, the apparatus A includes conduit assembly C, reservoir R and pump P. In order to control or affect the temperature of the pipe B, conduit assembly C is mounted in heat exchanging relationship thereto (FIG. 2) and heated or cooled fluid from reservoir R is circulated through conduit assembly C under pressure provided by pump P. Conduit assembly C is mounted to the pipe B using heat transfer cement T or any suitable conventional heat transfer mounting method such as are disclosed in U.S. Pat. No. 3,949,189, the contents of which are hereby incorporated by reference as if fully set forth herein. A portion of a conduit assembly C mounted to a pipe B is shown in expanded cross-section in FIG. 2.

Figure 1:
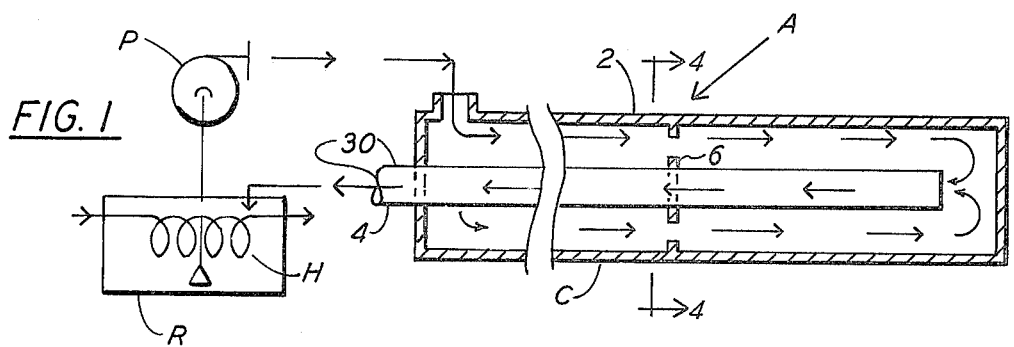
FIG. 1 is a schematic drawing of an apparatus according to the present invention.

Considering the invention in more detail, in FIG. 1, pump P is a conventional pump suitable for circulating fluid under pressure from reservoir R through conduit assembly C. Depending upon the configuration desired, pump P may be provided in series association between reservoir R and conduit assembly C or in parallel to provide the necessary pressure differential to cause fluid from reservoir R to flow through conduit assembly C. Reservoir R is suitable for holding the volume of fluid necessary to maintain a continuous flow of fluid from reservoir R through the extremities of conduit assembly C, and, at the same time to maintain the fluid level in reservoir R above heat control apparatus H shown schematically in FIG. 1. Thus the volume and dimensions of reservoir R will be dictated by the requirements of the particular application including the length and dimensions of conduit assembly C which determine the volume of fluid which may be in circulation at any given time. Heat control element H is a conventional heating or cooling element which has an associated thermostat or control mechanism (not shown) suitable for the particular application. For heating applications, any suitable conventional electrical resistance heating apparatus which includes a thermostat or control mechanism for controlling the temperature of fluid held in reservoir R may be used. Conversely, for cooling applications, heat control element H may be a conventional cooling element suitable for refrigerating fluid held in reservoir R, or even a combined heating and cooling element.

Figure 3:
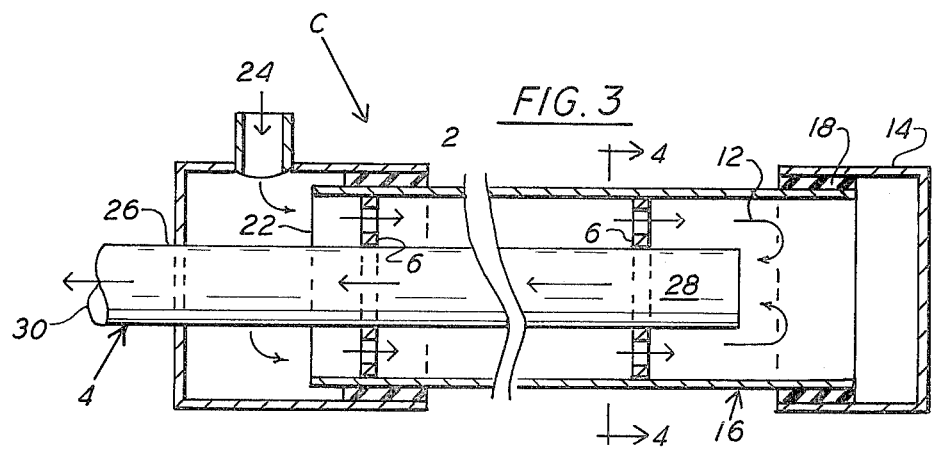
FIG. 3 is a partial cross-sectional view of a portion of the apparatus according to the present invention.
Figure 4:
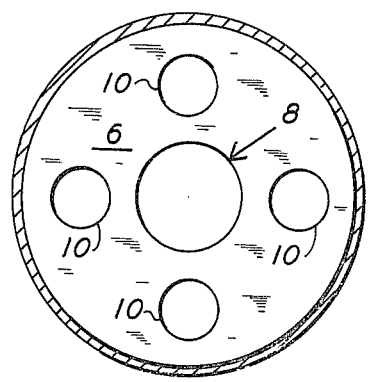
FIG. 4 is an elevation of a portion of the apparatus according to the present invention.

Conduit assembly C is shown in cross-sectional detail in FIG. 3. In one embodiment, conduit C includes outer conduit 2, and inner conduit 4 mounted coaxially within conduit 2 on annular spacing disks 6. Disks 6 are shown in cross-section in FIG. 3 and in full elevational view in FIG. 4. Each disk 6 is adapted to fit in supporting engagement with the inner diameter of conduit 2 and is provided with a central orifice 8 adapted for receiving inner conduit 4. Each disk 6 is further provided with passageways 10 spaced radially about the body of the disk 6 to allow fluid communication within the flow space between conduits 2 and 4 in the manner depicted by the arrows 12 in FIG. 3.

Figure 5:
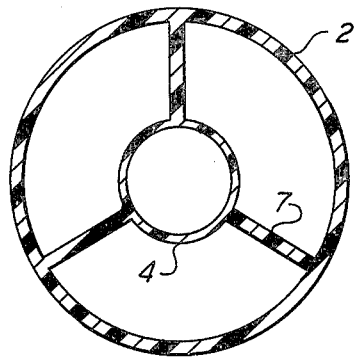
Figure 6:
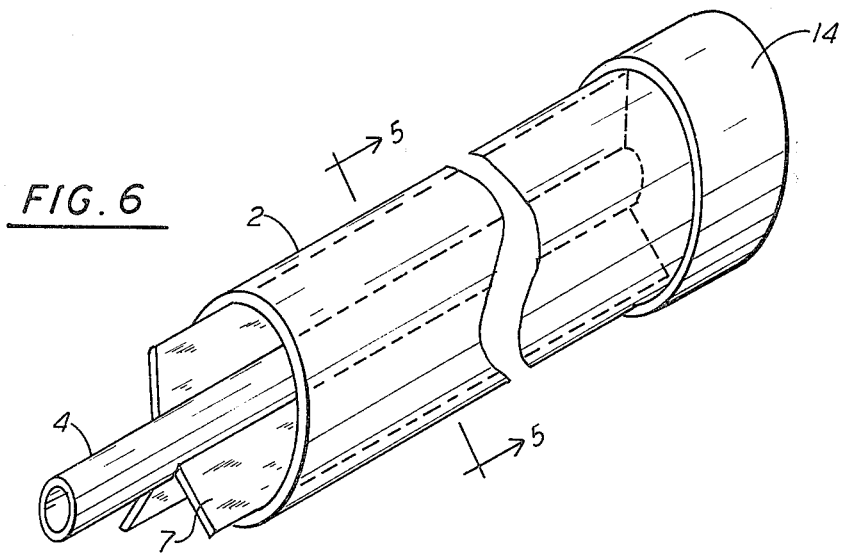

In another embodiment, conduit assembly C is formed in continuous lengths of a plastic material using known extrusion techniques as shown in FIGS. 5 and 6. In this embodiment inner conduit 4 is mounted within outer conduit 2 on radial fins 7 formed in the extrusion process which project from conduit 4 to the inner surface of conduit 2 to provide support. While three fins 7, spaced at one-hundred twenty degree intervals about the center of conduit 4 are illustrated in FIG. 5, other configurations could be used as long as the annular flow space between conduits 2 and 4 is preserved.

Cap 14 or other suitable closure means is mounted over open end 16 of conduit 2 to form a closed, fluid-tight seal. Cap 14 is preferably mounted to conduit 2 using a suitable water tight sealant 18 disposed between cap 14 and conduit 2. Manifold 20 is preferably mounted in a similar manner to open end 22 of conduit 2 opposite cap 14. Manifold 20 is provided with inlet port 24 for receiving the heated or cooled fluid from reservoir R. Manifold 20 is also provided with an outlet port 26 adapted to receive and form a fluid tight seal about inner conduit 4. The junction of conduit 4 and the port 26 in the manifold 20 is sealed with an appropriate water tight sealant such as epoxy resin or other suitable bonding agent.

In this manner, inner conduit 4 is mounted coaxially within outer conduit 2 and provides a self-contained return conduit for the heat transfer fluid. Conduit 4 is mounted with its distant end 28 in proximity to end 16 of conduit 2 which is closed by cap 14. Conduit 4 is thereby positioned to receive the reverse flow of fluid from conduit 2 in the manner indicated by arrows 12. The fluid return conduit is provided by conduit 4 which discharges through port 26 into reservoir R.

In the operation or use of the present invention, the heat transfer conduit assembly C is made of any desired length so that it can be mounted on one side of a pipe B or other object, usually for the full length of such pipe B carrying the fluid being heated or cooled by the fluid in the assembly C. Thus, the end 30 of the inner conduit 4 is generally located in close proximity to the reservoir R and the pump P, thereby avoiding any need for significant piping therebetween. For that reason, the assembly C is shown as of variable length by the break lines in FIGS. 1 and 3. Since the outer conduit 2 and the inner conduit 2 are preferably flexible enough to conform to curvatures or bends in the pipe B, the assembly C may be laid along pipe that is other than in a straight line, and under such circumstaces, this invention provides a particularly significant advantage in avoiding the need for a separate return line. The heated or cooled fluid from reservoir R is circulated by pump P through conduit assembly C to be in heat exchanging relationship with the pipe or other object B and then returned to reservoir R. Thus, the need for a separately mounted return conduit is eliminated, and the costs of installation of the heat tracing apparatus are greatly reduced.

The foregoing disclosure and description of the invention are illustrative and explanatory thereof, and various changes in the size, shape and materials, as well as in the details of the illustrated construction may be made without departing from the spirit of the invention.

I claim:

1. A heat transfer tracing line in combination with a pipeline comprising:

reservoir means for containing a quantity of heat transfer fluid;

means with said reservoir means for controlling the temperature of the heat transfer fluid in said reservoir means;

said tracing line being formed of a self-contained, loop conduit means having an inner conduit and an outer conduit, said conduit means having an inlet and an outlet, said inlet and said outlet being in fluid communication with said reservoir means;

pump means associated with said reservoir means to circulate the heat transfer fluid from said reservoir means through said conduit means and back to said reservoir means; and wherein said conduit means is mounted in heat exchanging relationship to the exterior of said pipeline.

2. The apparatus of claim 1, wherein said conduit means comprises:

said outer conduit, one end of said outer conduit being adapted to be connected to said reservoir means and the other end of said outer conduit being closed;

said inner conduit of smaller diameter than said outer conduit and mounted within said outer conduit forming an annular flow space therebetween, one end of said inner conduit being open and in fluid communication with the annular flow space and the other end of said inner conduit adapted for connecting to said reservoir for fluid flow thereto, whereby said outer conduit and said inner conduit form a self-contained conduit loop for circulating fluid from said reservoir to said closed end of said outer conduit and back to said reservoir.

3. The apparatus of claim 2, further comprising:

manifold means for connecting said conduit means to said reservoir means for fluid flow therebetween.

4. The apparatus of claim 3, wherein said manifold means comprises:

a cylindrical cap mounted to said outer conduit, said cap having an inlet port and an outlet port formed therein, said inlet port being in fluid communication with the annular flow space, and said outlet port being in fluid communication with said inner conduit.

5. The apparatus of claim 4, wherein said outlet port in said cap is adapted to receive and form a fluid tight seal about said inner conduit, said inner conduit passing through said outlet port for connecting to said reservoir means.

6. The apparatus of claim 2, wherein said inner conduit is mounted concentrically within said outer conduit on an annular ring spacer carried in the annular flow space and in supporting engagement between said outer conduit and said inner conduit, said spacer further having an orifice formed therein to allow fluid flow within the annular flow space formed between said outer conduit and said inner conduit.

7. The apparatus of claim 2, wherein said inner conduit is mounted within said outer conduit on radial fins, said fins projecting from said inner conduit to be in supporting engagement with said outer conduit.

8. The apparatus of claim 1, wherein said conduit means is mounted to said pipeline with heat transfer adhesive material.

* * * * *